US008890826B2

(12) United States Patent
Sato

(10) Patent No.: US 8,890,826 B2
(45) Date of Patent: Nov. 18, 2014

(54) POSITION DETECTION SENSOR UNIT AND POSITION DETECTION APPARATUS

(75) Inventor: Yuta Sato, Saitama (JP)

(73) Assignee: Wacom Co., Ltd., Saitama (JP)

( * ) Notice: Subject to any disclaimer, the term of this patent is extended or adjusted under 35 U.S.C. 154(b) by 216 days.

(21) Appl. No.: 13/601,877

(22) Filed: Aug. 31, 2012

(65) Prior Publication Data

US 2013/0082925 A1  Apr. 4, 2013

(30) Foreign Application Priority Data

Sep. 30, 2011  (JP) .................................. 2011-218196

(51) Int. Cl.
*G06F 3/041* (2006.01)
*G06F 3/044* (2006.01)
*G06F 3/046* (2006.01)

(52) U.S. Cl.
CPC ................ *G06F 3/044* (2013.01); *G06F 3/046* (2013.01); *G06F 2203/04103* (2013.01)
USPC ............................ 345/173; 345/156; 439/493

(58) Field of Classification Search
USPC ............ 345/156, 173, 174, 179; 349/12, 149; 439/493, 495, 496
See application file for complete search history.

(56) References Cited

U.S. PATENT DOCUMENTS

| | | | |
|---|---|---|---|
| 5,844,175 A * | 12/1998 | Nakanishi et al. | 178/18.03 |
| 6,304,251 B1 * | 10/2001 | Ito et al. | 345/173 |
| 6,356,259 B1 * | 3/2002 | Maeda et al. | 345/173 |
| 6,885,157 B1 * | 4/2005 | Cok et al. | 315/169.3 |
| 6,903,729 B2 * | 6/2005 | Nakanishi et al. | 345/173 |
| 7,554,624 B2 * | 6/2009 | Kusuda et al. | 349/58 |
| 8,411,043 B2 * | 4/2013 | Kao et al. | 345/173 |
| 8,484,838 B2 * | 7/2013 | Badaye et al. | 29/846 |
| 8,730,201 B2 * | 5/2014 | Kuo et al. | 345/174 |
| 2002/0089493 A1 * | 7/2002 | Hong | 345/173 |
| 2002/0186209 A1 * | 12/2002 | Cok | 345/173 |
| 2004/0027340 A1 * | 2/2004 | Muraoka et al. | 345/173 |
| 2005/0046622 A1 * | 3/2005 | Nakanishi et al. | 345/173 |
| 2005/0099402 A1 * | 5/2005 | Nakanishi et al. | 345/173 |
| 2005/0286008 A1 * | 12/2005 | Miyagawa et al. | 349/158 |
| 2006/0125981 A1 * | 6/2006 | Okuda | 349/110 |
| 2007/0291963 A1 * | 12/2007 | Watanabe et al. | 381/152 |
| 2009/0033634 A1 * | 2/2009 | Shih et al. | 345/173 |
| 2009/0096759 A1 * | 4/2009 | Nishiwaki et al. | 345/173 |
| 2009/0115743 A1 * | 5/2009 | Oowaki | 345/174 |

(Continued)

FOREIGN PATENT DOCUMENTS

JP  2011064658 A  3/2011

*Primary Examiner* — Joe H Cheng
(74) *Attorney, Agent, or Firm* — Seed IP Law Group PLLC

(57) ABSTRACT

A position detection sensor unit is provided, including: a sensor substrate on which conductors for detecting a position pointed to by a pointer are disposed; and a position pointing operation member having a first face, on which a position is to be pointed to by the pointer, and a second face on the opposite side of the first face on which the sensor substrate is fixed. A flexible cable is extended from the sensor substrate so as to be connected to a signal processing circuit for determining a position pointed to by the pointer. A portion of the flexible cable, corresponding to a predetermined length extending from an end edge of the position pointing operation member toward the interior of the position pointing operation member along the direction in which the flexible cable extends, is arranged to be movable away from the second face of the position pointing operation member.

9 Claims, 8 Drawing Sheets

(56) References Cited

U.S. PATENT DOCUMENTS

| | | | |
|---|---|---|---|
| 2009/0166100 A1* | 7/2009 | Matsubara | 178/18.06 |
| 2009/0205879 A1* | 8/2009 | Halsey, IV et al. | 178/18.06 |
| 2009/0211818 A1* | 8/2009 | Kondo et al. | 178/18.03 |
| 2009/0278813 A1* | 11/2009 | Wijaya et al. | 345/173 |
| 2009/0322705 A1* | 12/2009 | Halsey, IV | 345/174 |
| 2010/0026648 A1* | 2/2010 | Kimura et al. | 345/173 |
| 2010/0108409 A1* | 5/2010 | Tanaka et al. | 178/18.06 |
| 2010/0188354 A1* | 7/2010 | Tamura | 345/173 |
| 2010/0295800 A1* | 11/2010 | Kuo | 345/173 |
| 2011/0069022 A1 | 3/2011 | Yokota et al. | |
| 2011/0141042 A1* | 6/2011 | Kim et al. | 345/173 |
| 2012/0050958 A1* | 3/2012 | Sanford et al. | 361/679.01 |

* cited by examiner

POSITION DETECTION SENSOR UNIT AND POSITION DETECTION APPARATUS

CROSS-REFERENCE TO RELATED APPLICATION

The present application claims priority under 35 U.S.C. 119(a) of Japanese Application No. 2011-218196, filed Sep. 30, 2011, the entire content of which is incorporated herein by reference.

BACKGROUND OF THE INVENTION

1. Field of the Invention

The present invention relates to a position detection sensor unit and a position detection apparatus for detecting a position of a pointer such as a finger or a position pointer.

2. Description of the Related Art

A position detection apparatus for detecting a position pointed to by a pointer such as a finger or a pen is known. As a position detection method used for the position detection apparatus, various methods are available such as a resistive film method, an electromagnetic induction method, a capacitance method and so forth.

FIG. 8 shows a configuration of an example of a sensor section of a position detection apparatus of the capacitance type. Referring to FIG. 8, the position detection apparatus is of the capacitance type of a so-called cross point capacitance type, which is developed from the capacitance type of a projection type. The sensor section of the position detection apparatus of the cross point capacitance type is configured such that it includes a plurality of upper electrodes Ex extending, for example, in a Y-axis direction or longitudinal direction of a pointing inputting face and a plurality of lower electrodes Ey extending in an X-axis direction or lateral direction. The upper electrodes Ex and the lower electrodes Ey are juxtaposed in a predetermined spaced relationship in the X-axis direction and the Y-axis direction, respectively, and perpendicularly cross each other while they are arrayed with a small gap interposed therebetween. In this instance, a predetermined fixed capacitor Co is formed at an overlapping portion, that is, at a cross point between each upper electrode Ex and each lower electrode Ey.

When a pointer 1000, such as a position pointer held by the user or a finger of the user, approaches or comes in contact with a position on the pointing inputting face, a capacitor Cf is formed between the pointer 1000 and the electrodes Ex and Ey at that position. The pointer 1000 is connected to the ground through the human body, that is, through a capacitor Cg. As a result, due to the capacitors Cf and Cg, the amount of movement of the charge between the upper electrode Ex and the lower electrode Ey at the position pointed to by the pointer 1000 varies. In the position detection apparatus of the cross point capacitance type, the position pointed to by the pointer 1000 on the pointing inputting face can be specified by detecting the variation of the amount of movement of the charge.

This variation of the amount of movement of the charge is detected by a signal processing circuit 1001. The signal processing circuit 1001 supplies a predetermined transmission signal to a lower electrode Ey used, for example, as a transmission electrode and receives a reception signal from an upper electrode Ex used as a reception electrode. The signal processing circuit 1001 detects a current variation of the reception signal to detect a variation of the amount of movement of the charge. The signal processing circuit 1001 switches between the transmission electrodes to supply a transmission signal to, and sequentially carries out a detection process of the current variation of the reception signal from the reception electrodes, to thereby detect the position of a pointer.

Not only in a sensor section of the cross point capacitance type as described above but also in any sensor section of the capacitance type, for the purpose of detecting the variation of the amount of movement of charge as described above, the distance between the pointer and the detection electrodes should be made as small as possible. Therefore, Japanese Patent Laid-Open No. 2011-64658 (hereinafter referred to Patent Document 1) describes a sensor section of the capacitance type, which is affixed to the surface or front face of the housing of the position detection apparatus. The sensor section is connected to the signal processing circuit in the inside of the housing via a cable of flexible material (a flexible cable) extending through an opening perforated in the housing.

FIGS. 9A to 9C show a structure of a position detection apparatus 100 including a sensor of the capacitance type as disclosed in Patent Document 1. FIG. 9A is a view of the position detection apparatus 100 as viewed from the face side, which accepts a pointing input of a pointer, and FIG. 9B is an enlarged sectional view taken along line A-A of FIG. 9A.

A housing 110 of the position detection apparatus 100 includes an upper case 1101 and a lower case 1102. A sensor section 120 of the capacitance type, hereinafter referred to as a position detection sensor unit 120, is affixed to the upper case 1101 of the housing 110. A signal processing circuit 130 for the position detection sensor unit 120 is provided in a space between the upper case 1101 and the lower case 1102 of the housing 110. The position detection sensor unit 120 and the signal processing circuit 130 are connected to each other via a through-hole 1104 provided in the upper case 1101.

The position detection sensor unit 120 is configured such that a sensor substrate 1202 formed of a flexible substrate is affixed by adhesive to the rear face side of a sheet member 1201 made of insulating material. The sheet member 1201 functions as a position pointing operation member, and the front face side thereof serves as a surface to which pointing input operation directed to a position is carried out by a pointer. On the flexible substrate of the sensor substrate 1202, a sensor including a conductor pattern of the electrodes Ex and Ey described hereinabove is formed.

From the position detection sensor unit 120, a flexible cable 1203 integrally formed with the flexible substrate 1202 is led out in a direction along the substrate face of the sensor substrate 1202. On the flexible cable 1203, a conductor pattern (not shown) is formed, which constitutes a lead section connected to the conductor pattern of the electrodes Ex and Ey of the sensor formed on the sensor substrate 1202. In this instance, the sheet member 1201 and the sensor substrate 1202 have areas substantially equal to each other (though the area of the sensor substrate 1202 may be slightly smaller than that of the sheet member 1201), and the position detection sensor unit 120 is a structure substantially in the form of a rectangular plate formed of the sheet member 1201 and the sensor substrate 1202 having substantially equal areas and being adhered to each other. The flexible cable 1203 is led out from an end edge portion of the position detection sensor unit 120 in the form of a rectangular plate.

The upper face of the upper case 1101 provides a space, to which the position detection sensor unit 120 is affixed, in the form of a recessed portion 1103 of a size and a depth corresponding to the size and the thickness of the position detection sensor unit 120. A bottom portion of the recessed portion 1103 of the upper case 1101 has a form of a flat face, to which the position detection sensor unit 120 is affixed. The position detection sensor unit 120 is adhered at the sensor substrate 1202 side thereof to the bottom portion of the recessed portion 1103 by adhesive to secure the position detection sensor unit 120 to the upper face of the upper case 1101.

At an end edge position of the bottom portion of the recessed portion 1103 corresponding to the led-out position of the flexible cable 1203 of the position detection sensor unit 120, the through-hole 1104 is perforated for threading the flexible cable 1203 therethrough into the space between the upper case 1101 and the lower case 1102. The flexible cable 1203 of the position detection sensor unit 120 is bent at a substantially right angle as seen in FIG. 9B and is threaded through the through-hole 1104 into the space between the upper case 1101 and the lower case 1102 from the upper face of the upper case 1101. Since the housing 110 has a flattened shape of a small thickness, the flexible cable 1203 is again bent in the space between the upper case 1101 and the lower case 1102 and connected to the signal processing circuit 130 provided in the space between the upper case 1101 and the lower case 1102.

While, in the sectional view of FIG. 9B, a gap is illustrated between each of the sheet member 1201, the sensor substrate 1202, and the upper case 1101 to provide readily understandable illustration, in reality the members are adhered to each other by adhesive and are in a uniformly closely contacting state.

SUMMARY OF THE INVENTION

In the existing position detection apparatus described hereinabove with reference to FIGS. 9A to 9C, the sensor substrate 1202 (excluding the flexible cable 1203) is covered with the sheet member 1201 to prevent capacitive noise from mixing through the electrodes of the sensor substrate 1202. Further, the flexible cable 1203 led out from an end edge portion of the position detection sensor unit 120 is bent at a substantially right angle and is threaded through a through-hole perforated in the upper case 1101 into the space between the upper case 1101 and the lower case 1102 so that the flexible cable 1203 is not exposed to the upper face side of the upper case 1101. Consequently, the flexible cable 1203 is prevented from being touched by a pointer, such as a finger, so as to prevent capacitive noise from mixing through the flexible cable 1203 to cause malfunction.

The flexible cable 1203 is generally made of flexible material having flexibility and elasticity (resilience), such that to any bent portion force is applied to restore it to a straight state. In the position detection apparatus 100 shown in FIGS. 9A to 9C, the flexible cable 1203 is bent at a right angle as it is introduced into the space between the upper case 1101 and the lower case 1102, and is again bent in the space between the upper case 1101 and the lower case 1102 to be connected to the signal processing circuit 130.

Therefore, force tending to restore an original straight state acts upon each of the two bent portions of the flexible cable 1203 including the right angle bent portion at the led-out portion from the position detection sensor unit 120 and the bent portion in the space between the upper case 1101 and the lower case 1102, which force may eventually act in a direction to push the position detection sensor unit 120 upwardly as indicated by arrows AR in FIG. 9B.

If the force acting in the direction indicated by arrows AR acts upon the position detection sensor unit 120 for a long period of time, then an end edge of the position detection sensor unit 120 may be lifted away from the upper case 1101, as seen in FIG. 9C.

According to one aspect of the present invention, a position detection sensor unit and a position detection apparatus are provided which solve the problem described above.

According to a first embodiment of the present invention, a position detection sensor unit is provided including a sensor substrate, on which conductors for detecting a position pointed to by a pointer are disposed, and a position pointing operation member. The position pointing operation member includes a first face, on which a position is to be pointed to by the pointer, and a second face provided on the opposite side of the first face and on which the sensor substrate is disposed. The sensor substrate is fixed to the second face of the position pointing operation member. A flexible cable having a predetermined width and length is extended from the sensor substrate so as to be connected to a signal processing circuit for determining a position pointed to by the pointer. A portion of the flexible cable, corresponding to a predetermined length extending from an end edge of the position pointing operation member toward the inner side of the position pointing operation member along the direction in which the flexible cable extends, is arranged to be movable away from (not fixed to) the second face of the position pointing operation member.

In the position detection sensor unit, the sensor substrate is affixed to the position pointing operation member having an area greater than the sensor substrate. Further, the flexible cable is provided to extends from a position on the inner side of the position pointing operation member toward and beyond the end edge of the position pointing operation member in the direction along the second face of the position pointing operation member without being attached to the position pointing operation member.

Therefore, the position detection sensor unit may be attached to a housing of a position detection apparatus, with a portion of the housing of the position detection apparatus being inserted between the position pointing operation member and the flexible cable.

According to a second embodiment of the present invention, a position detection apparatus is provided including an upper case, a lower case coupled to the upper case, a position detection sensor unit disposed on the upper face side of the upper case and configured to detect a position pointed to by a pointer, and a signal processing circuit disposed in a space formed between the upper case and the lower case. The position detection sensor unit includes a sensor substrate, on which conductors for detecting a position pointed to by the pointer are disposed, and a position pointing operation member. The position pointing operation member includes a first face, on which a position is to be pointed to by the pointer, and a second face provided on the opposite side of the first face and on which the sensor substrate is disposed. The sensor substrate is fixed to the second face of the position pointing operation member. A flexible cable having a predetermined width and length is extended from the sensor substrate so as to be connected to the signal processing circuit for determining a position pointed to by the pointer. A portion of the flexible cable, corresponding to a predetermined length extending from an end edge of the position pointing operation member toward the inner side of the position pointing operation member along the direction in which the flexible cable extends, is arranged to be movable away from the second face of the position pointing operation member. A recessed portion is provided on the upper face side of the upper case, in which the position detection sensor unit is disposed and in which a through-hole is provided such that the flexible cable extending in the direction along the second face of the position pointing operation member may be threaded through the through-hole into the space formed between the upper case and the lower case to be connected to the signal processing circuit disposed in the space between the upper case and the lower case.

In the position detection apparatus, the flexible cable is threaded through the through-hole of the upper case into the space between the upper case and the lower case, with a portion of the upper case near the through-hole existing between the position pointing operation member and the flexible cable of the position detection sensor unit, while maintaining that the flexible cable extends along the face of the position pointing operation member. Then, the flexible cable is connected to the signal processing circuit in the space between the upper case and the lower case.

Accordingly, with the position detection apparatus, the flexible cable is introduced into the space between the upper case and the lower case through the through-hole of the upper case without being bent. Further, even if the flexible cable introduced in the space between the upper case and the lower case is bent and connected to the signal processing circuit, force originating from restoring force tending to restore a straight state of the flexible cable and acting toward the upper case is received by the portion of the upper case near the through-hole existing between the position pointing operation member and the flexible cable. Therefore, with the position detection apparatus, the position detection sensor unit is not lifted away from the upper case.

Further, with the position detection apparatus, since the flexible cable extending from the inner side of the position pointing operation member is led out to the lower face side of the upper case through the through-hole, the flexible cable is not exposed to the upper face side of the upper case. Therefore, as one advantage, the flexible cable is less likely to be influenced by capacitive noise.

In summary, according to various embodiments of the present invention, the position detection sensor unit is not lifted away from the upper case of the position detection apparatus. Further, since the flexible cable extending from the inner side of the position pointing operation member is led out to the lower face side of the upper case through the through-hole, advantageously the flexible cable is not exposed to the upper face side of the upper case and is less likely to be influenced by capacitive noise.

DETAILED DESCRIPTION OF THE PREFERRED EMBODIMENTS

Figure 1:
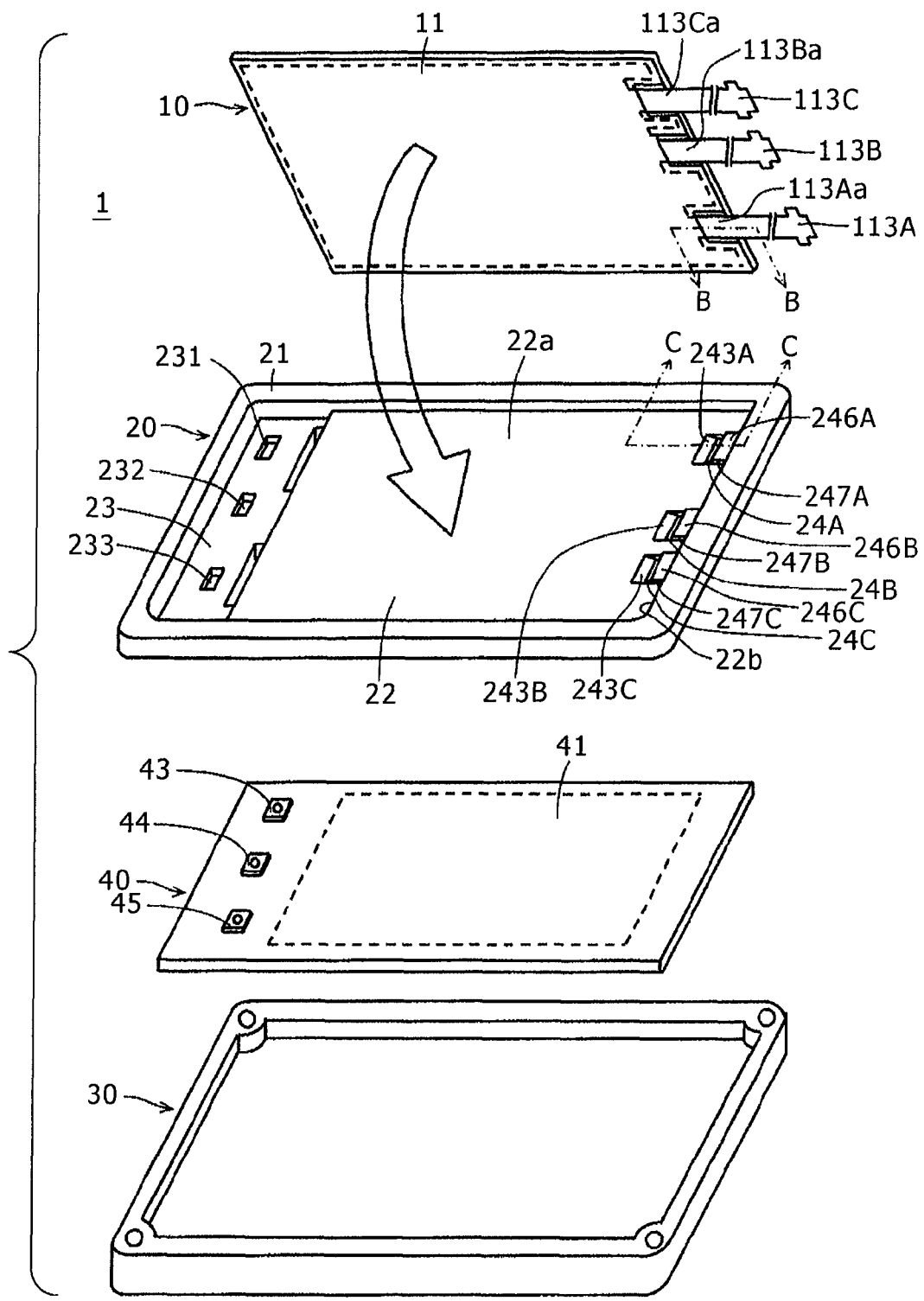
FIG. 1 is an exploded perspective view of a position detection apparatus according to an embodiment of the present invention.
Figure 2:
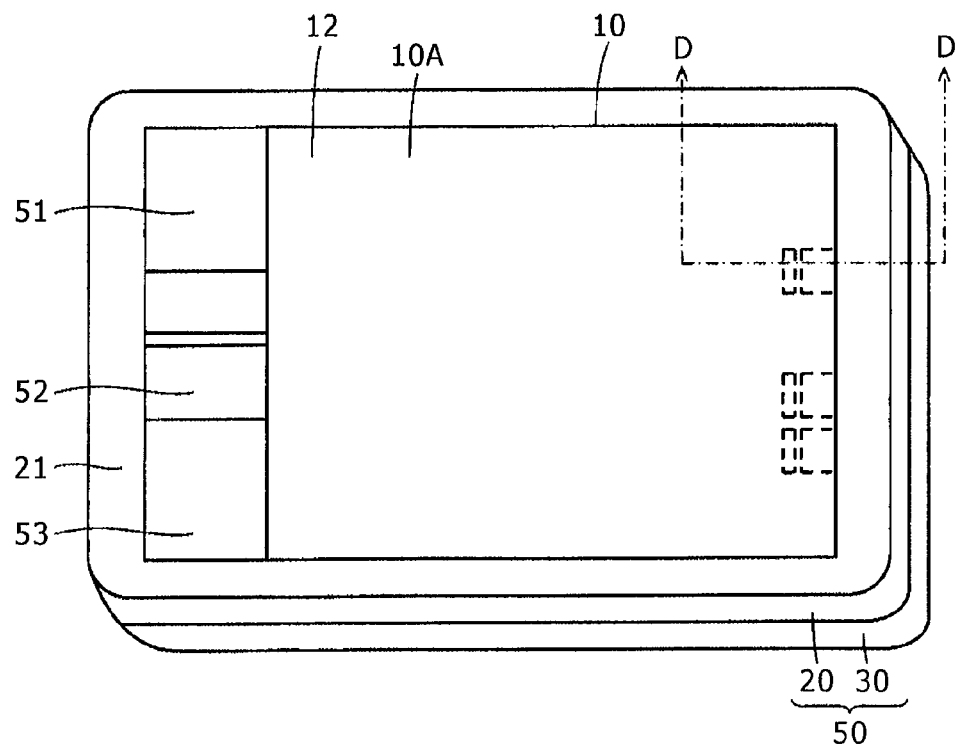
FIG. 2 is a perspective view showing an example of an appearance of the position detection apparatus of FIG. 1.

FIG. 1 is an exploded perspective view showing an example of a general configuration of a position detection apparatus 1 according to an embodiment of the present invention. FIG. 2 shows a general configuration of the position detection apparatus 1 of the present embodiment after assembly as viewed from the side of the position detection apparatus 1 on which pointing inputting is carried out using a pointer.

Referring first to FIG. 1, the position detection apparatus 1 includes a position detection sensor unit 10 of the capacitance type, an upper case 20 made of an insulating material, a lower case 30 similarly made of an insulating material, and a printed wiring board 40 on which a sensor section 41 of the electromagnetic induction type is formed. In FIG. 1, the position detection sensor unit 10 is shown as viewed obliquely from below, and the upper case 20, lower case 30 and printed wiring board 40 are shown as viewed obliquely from above.

In the present embodiment, the position detection sensor unit 10 is affixed to an upper face 21 side of the upper case 20, and a front face 10A of the position detection sensor unit 10 is used as a face, on which a position is to be pointed to by a pointer and which is exposed to the outside, as seen in FIG. 2. In the embodiment shown in FIG. 2, predetermined push buttons 51, 52 and 53 are provided leftwardly of the position detection sensor unit 10 on the upper face 21 side of the upper case 20.

The upper case 20 and the lower case 30 are engaged with each other to form a housing 50 of the position detection apparatus 1 as seen in FIG. 2. The printed wiring board 40 is accommodated in a space between the upper case 20 and the lower case 30.

Figure 3:
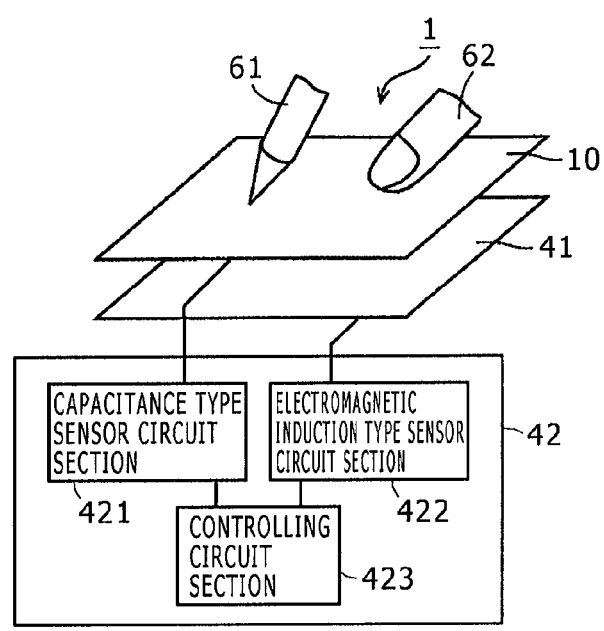
FIG. 3 is a schematic block diagram showing an example of a configuration of a sensor circuit of the position detection apparatus.

As shown in FIG. 3, in addition to the sensor section 41 of the electromagnetic induction type, a signal processing circuit 42 is formed also on the printed wiring board 40, although the signal processing circuit 42 is not shown in FIG. 1. The position detection apparatus 1 of the present embodiment includes two different sensor sections—the position detection sensor unit 10 of the capacitance type, and the sensor section 41 of the electromagnetic induction type—and the signal processing circuit 42 includes two signal processing sections for these two different sensors.

In particular, referring to FIG. 3, the signal processing circuit 42 of the printed wiring board 40 includes a capacitance type sensor circuit section 421 connected to the position detection sensor unit 10, and an electromagnetic induction type sensor circuit section 422 connected to the sensor section 41 of the electromagnetic induction type. The signal processing circuit 42 further includes a controlling circuit section 423 connected to the capacitance type sensor circuit section 421 and the electromagnetic induction type sensor circuit section 422 for generally controlling the position detection apparatus 1.

The electromagnetic induction type sensor circuit section 422 detects the position of a reception electrode, which receives an AC (alternative current) signal from a pen 61 which forms a pointer for the electromagnetic induction type. On the sensor section 41 of the electromagnetic induction type, reception electrodes for receiving an AC signal from the pen 61, which forms a pointer for the electromagnetic induction type, are formed on at least one face side of the printed wiring board 40. The sensor section 41 of the electromagnetic induction type and the electromagnetic induction type sensor circuit section 422 are electrically connected to each other by a wiring line pattern provided on the printed wiring board 40.

Meanwhile, to the position detection sensor unit 10, a predetermined transmission signal is supplied from the capacitance type sensor circuit section 421. Further, a reception signal from the position detection sensor unit 10 is supplied to the capacitance type sensor circuit section 421. The capacitance type sensor circuit section 421 thus detects the position of a finger 62 or a capacitive pen (not shown) based on a reception signal from the position detection sensor unit 10, as a position pointed to by the pointer based on a variation of the capacitance as described above.

The position detection sensor unit 10 of the present embodiment is provided in a position spaced apart from the printed wiring board 40 with the upper case 20 interposed therebetween. Therefore, electric connection between the position detection sensor unit 10 and the capacitance type sensor circuit section 421 of the printed wiring board 40 is established using a connection cable led out from the position detection sensor unit 10 through an opening or through-hole provided in the upper case 20.

In the following, a detailed configuration of the position detection sensor unit 10 and the upper case 20 is described first, and an example of a configuration of portions for establishing connection between the position detection sensor unit 10 and the signal processing circuit 42 of the printed wiring board 40 is described.

[Example of the Configuration of the Position Detection Sensor Unit 10]

Figure 4:
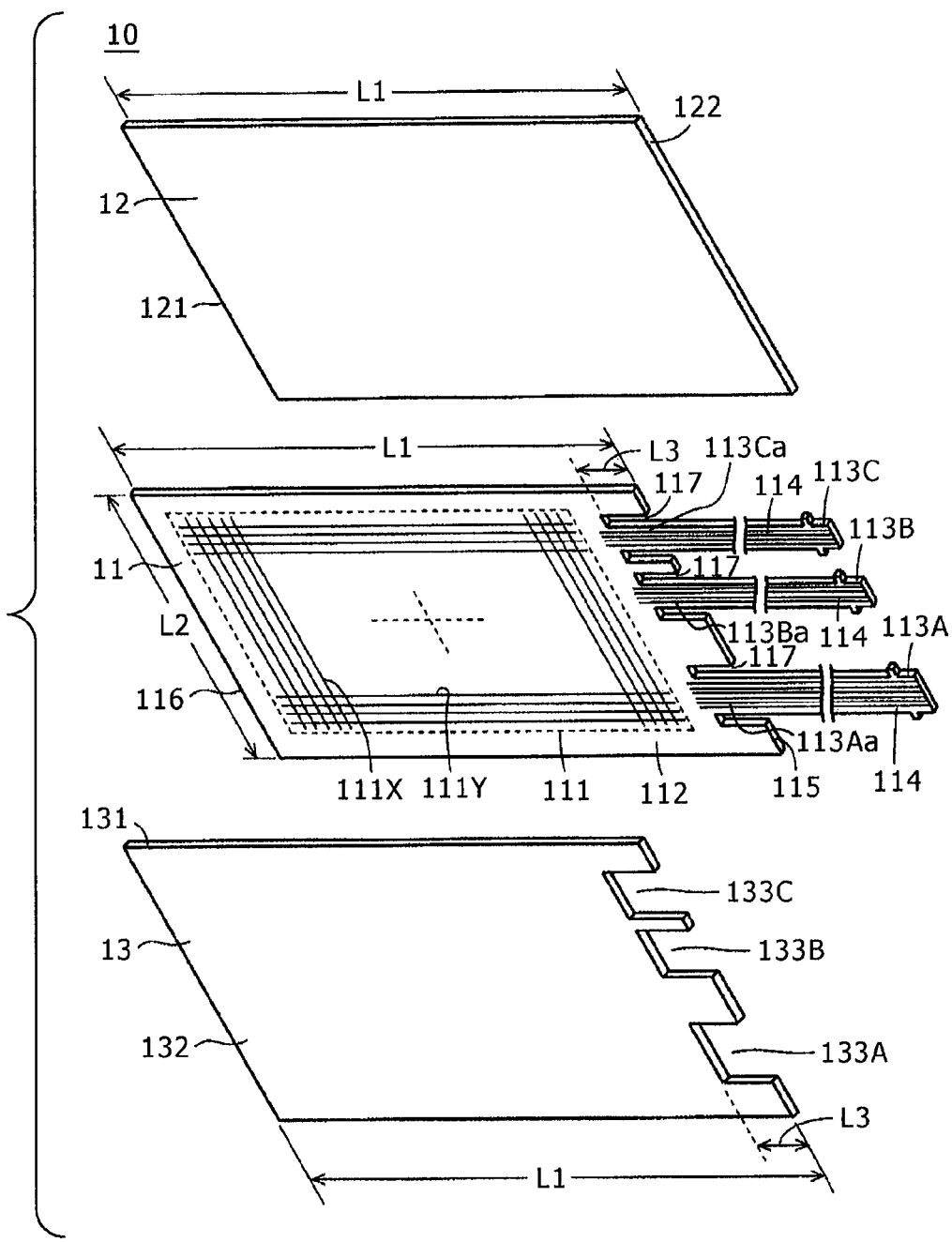
FIG. 4 is an exploded perspective view showing a form of a position detection sensor unit of the position detection apparatus of FIG. 1.

FIG. 4 is an exploded perspective view of the position detection sensor unit 10 used in the position detection apparatus 1 of FIG. 1 as viewed from the rear face side, to which the upper case 20 is attached.

Referring to FIG. 4, the position detection sensor unit 10 includes a sensor substrate 11 formed, in the present example, of a substrate made of flexible material (a flexible substrate), a sheet member 12, and an adhesive sheet 13.

The flexible substrate which forms the sensor substrate 11 includes a main body portion 112, and strip-form flexible cables 113A, 113B and 113C integrally led out from the main body portion 112 in a direction along the substrate plane. The flexible cables 113A, 113B and 113C individually have a predetermined cable length and a predetermined cable width.

The main body portion 112 of the sensor substrate 11 has a substantially rectangular shape, wherein the long side has a length L1 and the short side has another length L2. In the present example, a position detection sensor 111 for detecting a pointer based on a capacitance method is formed on one face side, which serves as a detection face side, of the main body portion 112. The position detection sensor 111 includes a plurality of conductor electrodes 111X disposed in a first direction such as, for example, a lateral direction, and a plurality of conductor electrodes 111Y disposed in a second direction perpendicular to the first direction such as, for example, a longitudinal direction.

Conductive patterns 114 individually connected to the plural conductor electrodes 111X and the plural conductor electrodes 111Y of the position detection sensor 111 are formed on each of the flexible cables 113A, 113B and 113C. In this manner, the electrodes 111X and 111Y of the position detection sensor 111 and the conductive patterns 114 of the flexible cables 113A, 113B and 113C are formed on the detection face side of the sensor substrate 11, that is, on the face of the sensor substrate 11 which is adhered to the sheet member 12 as hereinafter described.

All of the flexible cables 113A, 113B and 113C in the present example extend in the same direction, for ease of affixing the position detection sensor unit 10 to the upper case 20. In the present example, all of the flexible cables 113A, 113B and 113C are configured such that they extend in a direction along the long side direction of the main body portion 112.

Each of the flexible cables 113A, 113B and 113C extends from an extension starting position, which is not at an end edge of the rectangular shape of the main body portion 112 of the sensor substrate 11 but at a position displaced to the inner side by a predetermined length with respect to the end edge. In particular, in the example of FIG. 4, the flexible cables 113A, 113B and 113C are not formed such that they extend from an end edge of one of the short sides 115 of the rectangular shape of the main body portion 112 but from a position displaced to the inner side by a length L3 from the end edge of the short side 115. Therefore, in the present example, a plurality of cutouts or notches 117 having the length L3 in the direction perpendicular to the short side 115 are formed on the short side 115 of the position detection sensor 111 of the sensor substrate 11, such that the flexible cables 113A, 113B and 113C each include a portion corresponding to the length L3 of the cutouts 117.

The sheet member 12 made of an insulating material forms a position pointing operation member, and has a front surface that servers as the front face 10A for detecting a position pointed to by a pointer. In the position detection sensor unit 10, the main body portion 112 of the sensor substrate 11, except the flexible cables 113A, 113B and 113C, is adhered to the rear face of the sheet member 12 by adhesive (not shown in FIG. 4).

The sheet member 12 in the present example has a rectangular shape, which is substantially the same as that of the main body portion 112 of the sensor substrate 11. Accordingly, the sheet member 12 in the present example has an area substantially equal to that of the main body portion 112 of the sensor substrate 11. Of course, however, the sheet member 12 may have an area greater than that of the sensor substrate 11.

The sensor substrate 11 is adhered to the rear face of the sheet member 12, as shown in FIG. 1, by adhesive. In the present example, the sensor substrate 11 is adhered such that a short side 116 thereof, from which the flexible cables 113A, 113B and 113C do not extend, is aligned such that it is positioned at a substantially same position as a short side 121 of the sheet member 12.

Accordingly, portions 113Aa, 113Ba and 113Ca of the length L3, which extend from the extension starting position of the flexible cables 113A, 113B and 113C on the main body portion 112 of the sensor substrate 11 to the end edge of the other short side 122 of the sheet member 12, overlap with the sheet member 12, as seen in FIG. 1. Since the flexible cables 113A, 113B and 113C of the sensor substrate 11 are not adhered to the rear face side of the sheet member 12 as described hereinabove, the portions 113Aa, 113Ba and 113Ca of the length L3 are movable away from the rear face of the sheet member 12. Therefore, a plate-like element can be inserted between the portions 113Aa, 113Ba and 113Ca, having the length L3, of the flexible cables 113A, 113B and 113C and the sheet member 12.

It is to be noted that the flexible cables 113A, 113B and 113C have a length selected such that, when they are adhered to the sheet member 12, they project outwardly by a predetermined length from the end edge of the short side 122 of the sheet member 12, as seen in FIGS. 1 and 4. The flexible cables 113A, 113B and 113C extending from the end edge of the short side 122 of the sheet member 12 have a length sufficient to allow them to be inserted in the space between the upper case 20 and the lower case 30 until it is connected to the signal processing circuit 42 of the printed wiring board 40.

The adhesive sheet 13 has a configuration of a double-sided tape wherein adhesive 131 is sandwiched between two release paper sheets. In the position detection sensor unit 10, the adhesive sheet 13, from which one of the release paper sheets is peeled and removed, is adhered to the sheet member 12, to which the sensor substrate 11 is adhered in such a manner as described above, by the adhesive 131 in such a manner as to cover the sensor substrate 11. In FIG. 4, the adhesive sheet 13 does not have the release paper sheet on the face side to be adhered to the sensor substrate 11 because it has been removed, and a release paper sheet 132 remains only on the face of the adhesive sheet 13 opposite to the face adhered to the sensor substrate 11.

The release paper sheet 132 is peeled off when the position detection sensor unit 10 is to be attached to the upper face of the upper case 20 as hereinafter described. Then, the position detection sensor unit 10 is affixed to the upper face of the upper case 20 by the adhesive 131.

In this instance, the adhesive sheet 13 has cutout portions 133A, 133B and 133C for preventing the adhesive 131 from being applied to the portions 113Aa, 113Ba and 113Ca, having the length L3, of the flexible cables 113A, 113B and 113C. Consequently, the flexible cables 113A, 113B and 113C are placed in a state in which the portions thereof, which extend from the extension starting position on the main body portion 112 of the sensor substrate 11 to the end edges thereof, can be freely deformed.

Figure 5A:
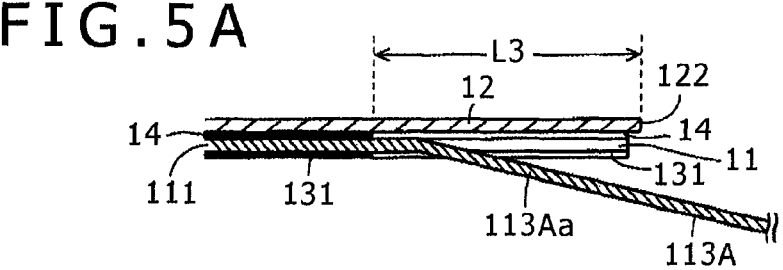
FIGS. 5A to 5D are cross sectional views of the position detection apparatus of FIG. 1 taken along different portions.

FIG. 5A is a sectional view taken along line B-B of the position detection sensor unit 10 shown in FIG. 1 and is a sectional view near the short side 122 of the sheet member 12. It is to be noted that, in FIG. 5A, adhesive 14 for adhering the sensor substrate 11 to the sheet member 12 is shown. Further, FIG. 5A illustrates a state in which the release paper sheet 132 has been peeled from the adhesive 131. In FIG. 5A, portions of the adhesive 14 and the adhesive 131 shown in cross sections are marked as thick black lines.

As seen in FIG. 5A, in the position detection sensor unit 10, the flexible cables 113A, 113B and 113C extend from the extension starting position at a position on the inner side with respect to the end edge of the main body portion 112 of the sensor substrate 11 of the rectangular shape.

It is to be noted that, in FIG. 5A, in order to illustrate a state in which the flexible cable 113A is freely deformable because it is not adhered to the sheet member 12, the flexible cable 113A is shown in a somewhat bent state. However, the flexible cable 113A is actually extended in a direction along the direction of the plane of the flexible substrate that forms the sensor substrate 11.

[Example of the Configuration of the Upper Case 20]

As seen in FIG. 1, on the upper face 21 side of the upper case 20 which is exposed to the outside, a recessed portion 22 is provided for accommodating the position detection sensor unit 10 to be affixed to the upper case 20, and a recessed portion 23 is provided for accommodating the push buttons 51, 52 and 53 shown in FIG. 2 (not shown in FIG. 1). In the recessed portion 23, through-holes 231, 232 and 233 are provided for allowing the push buttons 51, 52 and 53 and electronic switches 43, 44 and 45 provided on the printed wiring board 40 to be connected to each other therethrough. The depth (height) of the recessed portion 23 is selected such that, when the push buttons 51, 52 and 53 are accommodated in the recessed portion 23, the upper face of the push buttons 51, 52 and 53 lies flush with the upper face 21 of the upper case 20.

The recessed portion 22 for accommodating the position detection sensor unit 10 has a rectangular shape of a same shape and a same area as those of the position detection sensor unit 10, except the portions thereof at the flexible cables 113A, 113B and 113C. A bottom face 22a of the recessed portion 22 is formed as a flat face, and in order to allow the upper face 21 of the upper case 20 and the surface of the sheet member 12 of the position detection sensor unit 10 to lie flush with each other, the recessed portion 22 has a depth equal to the thickness of the position detection sensor unit 10 (excluding the thickness of the release paper sheets of the adhesive sheet 13).

In the recessed portion 22, through-holes 24A, 24B and 24C for allowing, when the position detection sensor unit 10 is accommodated in the recessed portion 22, the flexible cables 113A, 113B and 113C to be introduced through the upper case 20 into the space formed between the upper case 20 and the lower case 30.

The through-holes 24A, 24B and 24C are formed at positions of the recessed portion 22, at which the flexible cables 113A, 113B and 113C can be introduced into the space between the upper case 20 and the lower case 30 in a state in which they extend substantially in a direction along the detection face of the sensor substrate 11 without being bent. The size and the shape of the through-holes 24A, 24B and 24C are suitably determined to achieve such state.

The position of the through-holes 24A, 24B and 24C in the recessed portion 22 is set such that a part of the bottom portion of the recessed portion 22 of the upper case 20 can be inserted between the sheet member 12 and the portions 113Aa, 113Ba and 113Ca, having the length L3, of the flexible cables 113A, 113B and 113C.

In the following, particular examples of the through-holes 24A, 24B and 24C in the present embodiment are described.

The length of the through-holes 24A, 24B and 24C in the short side direction of the recessed portion 22 is selected to be slightly longer than the width of the flexible cables 113A, 113B and 113C in the form of a belt to be inserted into the through-holes 24A, 24B and 24C, respectively.

Figure 5B:
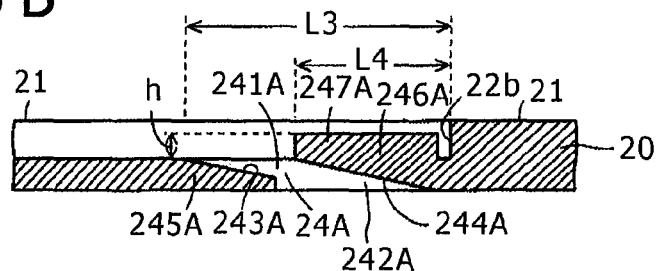

The through-holes 24A, 24B and 24C have a similar configuration in regard to the spaced positions from a wall 22b of the recessed portion 22 (see FIG. 5B), with which the short side 122 of the sheet member 12 contacts, and also in regard to the size and the shape of the through-holes 24A, 24B and 24C in the long side direction of the recessed portion 22. Therefore, in the following, the configuration of the through-holes 24A, 24B and 24C is described taking the through-hole 24A as an example. FIG. 5B is a sectional view taken along line C-C of FIG. 1 and shows a structure of the through-hole 24A in the present embodiment as well as a structure of associated elements.

The position of an opening 241A of the through-hole 24A on the bottom face 22a side of the recessed portion 22 is set near the extension starting position of the flexible cable 113A on the main body portion 112 of the sensor substrate 11 when the position detection sensor unit 10 is accommodated in the recessed portion 22 of the upper case 20. In order to satisfy the condition that a part of the bottom portion of the recessed portion 22 is inserted between the sheet member 12 and the portion 113Aa, having the length L3, of the flexible cable 113A, of the position detection sensor unit 10, the opening 241A of the through-hole 24A is provided at a position spaced by a distance L4 from the wall 22b of the recessed portion 22, with which the short side 122 of the sheet member 12 contacts. This distance L4 has a value smaller than that of the length L3 of the portion 113Aa of the flexible cable 113A, to satisfy $0 < L4 < L3$.

The through-hole 24A may be formed in a vertical direction perpendicular to the bottom face 22a of the recessed portion 22. However, if the through-hole 24A is formed in this manner, then in order to satisfy the condition that the flexible cable 113A can be introduced into the space between the upper case 20 and the lower case 30 in the state in which it extends in a direction along the detection face of the sensor substrate 11, it is necessary to make the opening 241A of the through-hole 24A larger. If the size of the opening 241A of the vertical through-hole 24A becomes large, then when a position pointing operation is carried out on the front face 10A of the position detection sensor unit 10 using a pointer, the user (operator) depressing a position of the through-hole with a pointer may feel a recess corresponding to the large size of the through-hole opening, which may be awkward.

Therefore, in the present embodiment, in order to avoid this problem and facilitate insertion of the flexible cable 113A in a state in which the flexible cable 113A extends in a direction along the detection face of the sensor substrate 11, the through-hole 24A is formed to extend in an obliquely downward direction along the extension direction of the flexible cable 113A as seen in FIG. 5B. In particular, the through-hole 24A is formed such that inclined faces 243A and 244A having an inclination of, for example, approximately 10 degrees with respect to the bottom face 22a of the recessed portion 22 are opposed to each other in the long side direction of the recessed portion 22.

Accordingly, an opening 242A of the through-hole 24A on the face of the upper case 20 on the side that opposes (faces) the lower case 30 is positioned closer to the wall 22b of the recessed portion 22 than the opening 241A on the bottom face 22a of the recessed portion 22. Further, at a portion of the bottom portion of the recessed portion 22 at which the through-hole 24A exists, a portion 245A having the inclined face 243A is formed to have a sectional shape at which the thickness of the upper case 20 gradually decreases in the extension direction of the flexible cable 113A, and a portion 246A having the inclined face 244A is formed to have a sectional shape at which the thickness of the upper case 20 gradually increases in the extension direction of the flexible cable 113A, as shown in FIG. 5B.

By forming the through-hole 24A such that it has a predetermined inclination in a direction directed obliquely from the upper face side to the lower face side of the upper case 20 along the direction in which the flexible cable 113A is inserted in this manner, the openings 241A and 242A of the through-hole 24A can be formed in a reduced size. Further, when a position pointing operation is carried out with a pointer on the front face 10A of the position detection sensor unit 10, even if a portion of the through-hole is depressed, the operator will hardly feel a recess due to the inclined face 243A of the through-hole 24A.

Figure 5C:
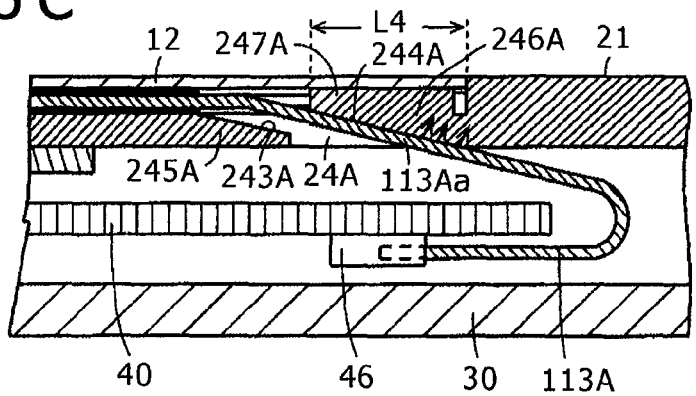

When the flexible cable 113A is inserted into the through-hole 24A inclined in such a manner as described above, and the position detection sensor unit 10 is accommodated into the recessed portion 22 of the upper case 20 as seen in FIG. 5C, then the portion 246A having the inclined face 244A is inserted between the sheet member 12 and the portion 113Aa, having the length L3, of the flexible cable 113A of the position detection sensor unit 10.

In this instance, the portion 246A having the inclined face 244A has the distance L4 described hereinabove from the wall 22b of the recessed portion 22. The portion 246A is hereinafter referred to as a guide portion.

In the present example, at a portion of the position detection sensor unit 10 on the inner side separated by the length L3 from the end edge on the side from which the flexible cable 113A extends outwardly, the sensor substrate 11 and the adhesive 14 and 131 exist, except the portion of the flexible cable 113A. On the other hand, in a state in which the guide portion 246A of the bottom portion of the recessed portion 22 of the upper case 20 is inserted between the sheet member 12 and the portion 113Aa, having the length L3, of the flexible cable 113A of the position detection sensor unit 10, none of the sensor substrate 11 and the adhesive 14 and 131 exists between the upper face of the guide portion 246A and the sheet member 12.

Therefore, if the upper face of the guide portion 246A lies flush with the bottom face 22a of the recessed portion 22, an air layer having a thickness equal to the thickness of the sensor substrate 11 and the adhesive 14 and 131 will be created above the guide portion 246A. Then, the operator pressing on a portion of the front face side of the sheet member 12 corresponding to the location of the air layer will feel a recess, which may be awkward.

Therefore, in the present embodiment, a stepped portion 247A is provided on the upper face of the guide portion 246A such that the upper face has a height greater by the thickness h of the sensor substrate 11 and the adhesive 14 and 131 than the height of the bottom face 22a of the recessed portion 22, as seen in FIGS. 1 and 5B.

The through-holes 24B and 24C and their associated elements are configured similarly to the through-hole 24A and the associated elements described hereinabove. It is to be noted that, in FIG. 1, like elements of the through-holes 24B and 24C and the associated elements to those of the through-hole 24A and the associated elements described hereinabove are denoted by like reference characters with a suffix B or C added thereto.

[Coupling Between the Upper Case 20 and the Position Detection Sensor Unit 10 in the Position Detection Apparatus 1]

Figure 5D:
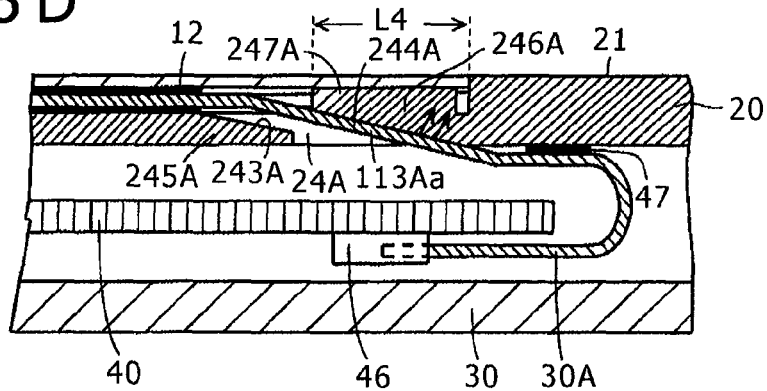

FIGS. 5C and 5D are sectional views of the position detection apparatus 1 taken along line D-D of FIG. 2. In the following, affixation of the position detection sensor unit 10 to the upper case 20 and its connection to the signal processing circuit 42 of the printed wiring board 40 are described with reference to FIGS. 1 and 4 together with FIGS. 5C and 5D.

When the position detection sensor unit 10 is to be affixed to the upper case 20 configured in such a manner as described above, the release paper sheet 132 of the adhesive sheet 13 is peeled off to expose the adhesive 131. Then, the flexible cables 113A, 113B and 113C of the position detection sensor unit 10 are threaded through the through-holes 24A, 24B and 24C of the upper case 20, and the short side 122 of the sheet member 12 of the position detection sensor unit 10 is placed into contact with the wall 22b of the recessed portion 22 of the upper case 20. At this time, the guide portions 246A, 246B and 246C (refer to FIG. 1) of the bottom portion of the recessed portion 22 of the upper case 20 are inserted between the flexible cables 113A, 113B and 113C and the sheet member 12 of the position detection sensor unit 10.

Then, the position detection sensor unit 10 is accommodated in position into the recessed portion 22 of the upper case 20, and the position detection sensor unit 10 is affixed to the recessed portion 22 of the upper case 20 with the adhesive 131.

Consequently, the flexible cables 113A, 113B and 113C of the position detection sensor unit 10 are threaded through the through-holes 24A, 24B and 24C into the space formed between the upper case 20 and the lower case 30 as seen in FIG. 5C. At this time, the portions 113Aa, 113Ba and 113Ca, having the length L3, of the flexible cables 113A, 113B and 113C are placed into contact with the inclined faces 244A, 244B and 244C (the inclined faces 244B and 244C are not shown) of the guide portions 246A, 246B and 246C which form the through-holes 24A, 24B and 24C, respectively, as seen in FIG. 5C.

Then, in the present example, the flexible cables 113A, 113B and 113C are curved in an arc and are inserted at an end thereof into a connector 46 of the signal processing circuit 42 provided on the rear side of the printed wiring board 40, to thereby establish electric connection between the position detection sensor unit 10 and the signal processing circuit 42.

Even if the flexible cables 113A, 113B and 113C existing in the space between the upper case 20 and the lower case 30 are curved in an arc in this manner, the restoring force of the flexible cables 113A, 113B and 113C having flexibility and elasticity is applied to the inclined faces 244A, 244B and 244C of the guide portions 246A, 246B and 246C, which contact with the portions 113Aa, 113Ba and 113Ca having the length L3, as indicated by arrow marks in FIG. 5C. Therefore, force acting to move (lift) the position detection sensor unit 10 upwardly from the recessed portion 22 of the upper case 20 is not generated.

It is to be noted that generation of the force to move the position detection sensor unit 10 upwardly from the recessed portion 22 of the upper case 20 can be prevented with a higher degree of certainty by the following measures. In particular, as seen in FIG. 5D, the portions of the flexible cables 113A, 113B and 113C existing in the space formed between the upper case 20 and the lower case 30 before they are curved in an arc may be adhered to the face side of the upper case 20 that opposes the lower case 30, for example, by adhesive 47.

The guide portions 246A, 246B and 246C of the upper case 20 made of an insulating material are inserted between the sheet member 12 and the portions 113Aa, 113Ba and 113Ca, having the length L3, of the flexible cables 113A, 113B and 113C of the position detection sensor unit 10, respectively. Therefore, the flexible cables 113A, 113B and 113C are not exposed to the front face 10A side of the position detection apparatus 1, and mixture of capacitive noise through the flexible cables 113A, 113B and 113C can be prevented.

Further, on the upper face of the guide portions 246A, 246B and 246C inserted between the sheet member 12 and the portions 113Aa, 113Ba and 113Ca, having the length L3, of the flexible cables 113A, 113B and 113C of the position detection sensor unit 10, the stepped portions 247A, 247B and 247C are provided, respectively. Therefore, even if the operator depresses the upper face of the guide portions 246A, 246B and 246C, the operator does not feel a recess.

Figure 9A:
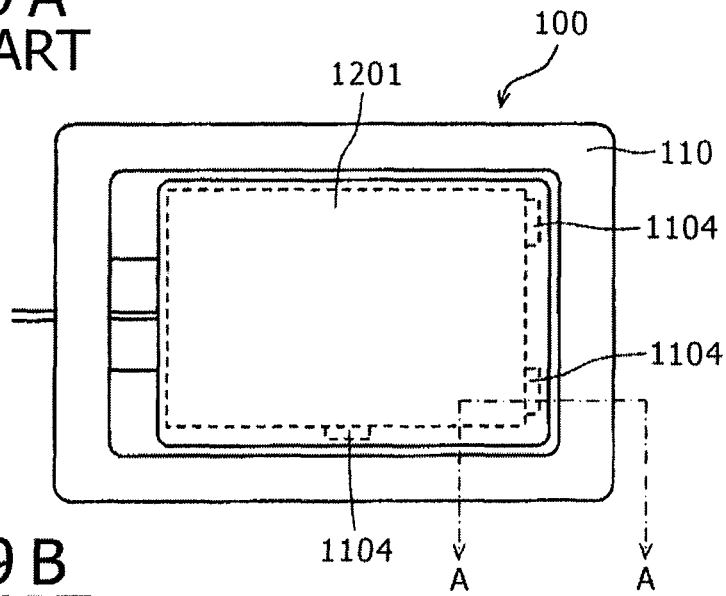
FIGS. 9A, 9B and 9C are a top plan view and cross sectional views, respectively, showing an example of a configuration of an existing position detection apparatus.
Figure 9B:
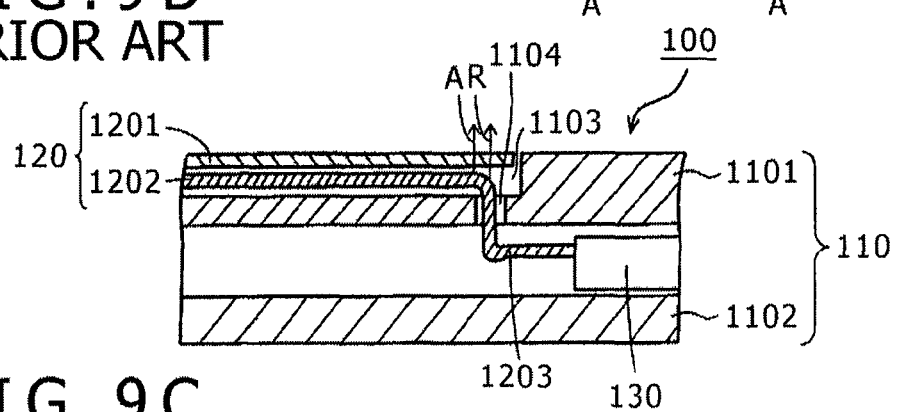
Figure 9C:
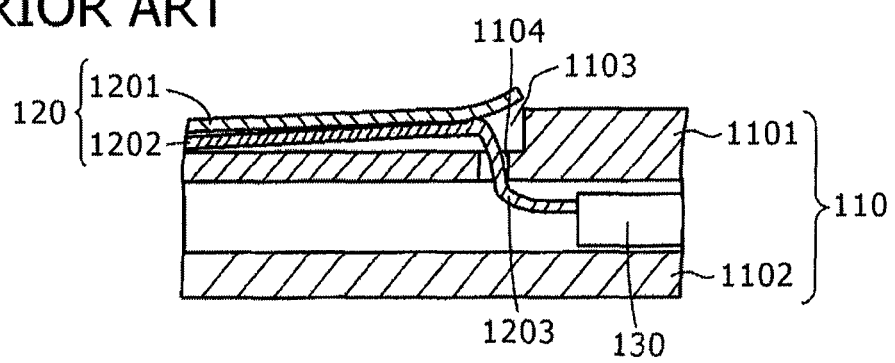

It is to be noted that, in the present embodiment, the flexible cables 113A, 113B and 113C are curved in an arc in order to connect them to the signal processing circuit 42. However, if the signal processing circuit 42 exists in the extending direction of the flexible cables 113A, 113B and 113C similarly as in the existing example described hereinabove with reference to FIGS. 9A to 9C, of course they need not be curved in an arc.

Further, in the embodiment described above, the guide portions 246A, 246B and 246C including the stepped portions 247A, 247B and 247C are provided corresponding to the through-holes 24A, 24B and 24C, respectively. However, it is also possible to otherwise configure a single common stepped portion for the through-holes 24A, 24B and 24C.

Figure 6:
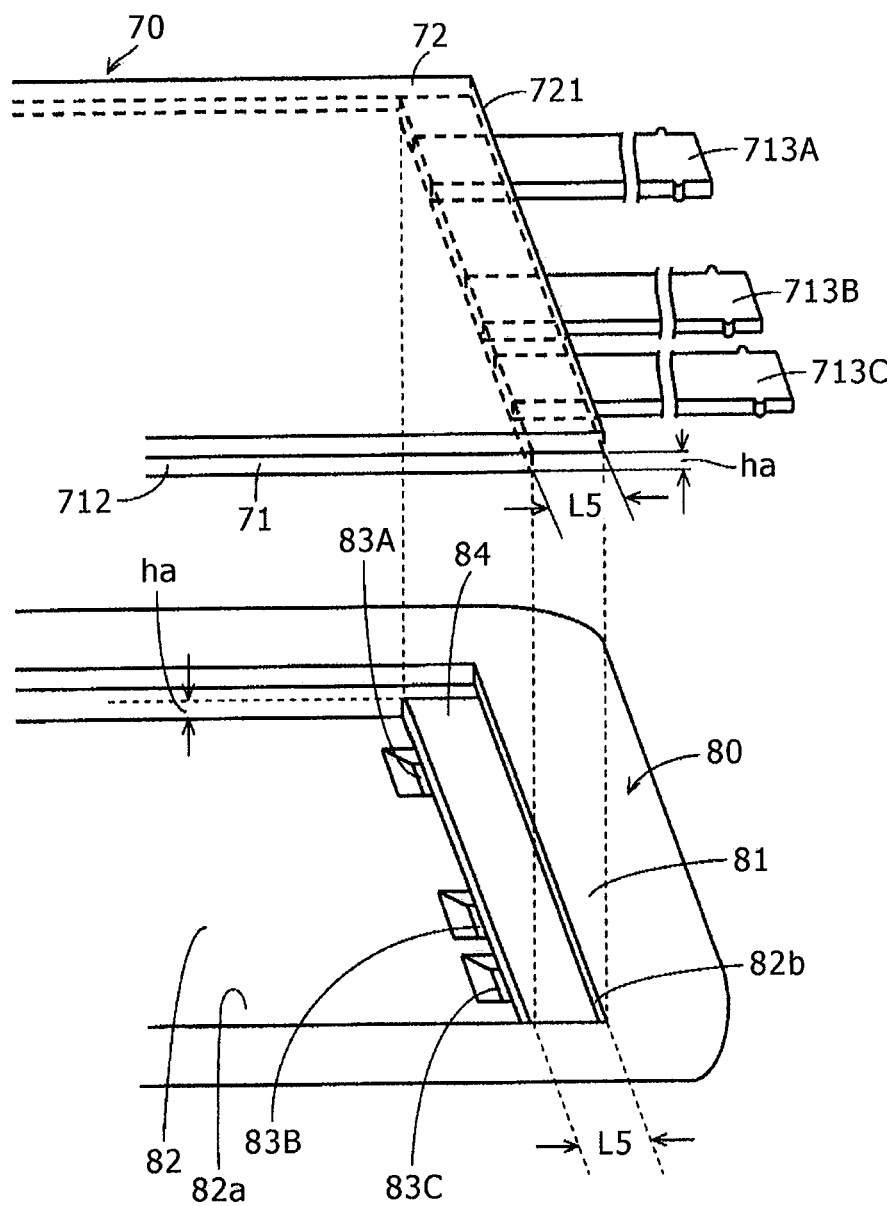
FIG. 6 is an exploded perspective view showing part of a position detection apparatus according to another embodiment of the present invention.

FIG. 6 shows a position detection sensor unit 70 and an upper case 80, where a single common stepped portion is applied. Referring to FIG. 6, the position detection sensor unit 70 in the example shown is configured such that a sensor substrate 71 is affixed to a sheet member 72, which is equivalent to the sheet member 12 in the example described hereinabove, with adhesive. The sensor substrate 71 in the present example includes a main body portion 712 of a rectangular shape, which is shorter by a length L5 (=L3) than the length of the longer side of the sheet member 72, and flexible cables 713A, 713B and 713C extending integrally from the main body portion 712 in the long side direction.

In the position detection sensor unit 70 of the present example, the flexible cables 713A, 713B and 713C overlap, at a portion thereof having the length L5, with the sheet member 72 as seen in FIG. 6. However, in the case of the position detection sensor unit 70 of the present example, different from the example described hereinabove, the sensor substrate 71 does not have any cutout or any notch, and no portion of the sensor substrate 71 nor an adhesive layer exist on either side of the flexible cables 713A, 713B and 713C of the length L5 that are overlapping with the sheet member 72.

On the other hand, in a recessed portion 82 formed on an upper face 81 side of the upper case 80 corresponding to the upper case 20 of the example described hereinabove, through-holes 83A, 83B and 83C are formed for allowing the flexible cables 713A, 713B and 713C to be threaded therethrough to a space between the upper case 80 and a lower case (not shown) similarly as in the example described hereinabove. The through-holes 83A, 83B and 83C have a structure similar to that in the example described hereinabove with reference to FIGS. 5A to 5D. Accordingly, each of the through-holes 83A, 83B and 83C has a guide portion (not shown) similar to that in the example described hereinabove.

In the present example, a stepped portion 84 of a uniform height "ha" is formed not only on the upper face of the guide portions of the through-holes 83A, 83B and 83C provided on the recessed portion 82 of the upper case 80 but also over the entire range of the recessed portion 82 in the short side direction along a wall 82b. The height ha of the stepped portion 84 is equal to the sum of the thickness of the sensor substrate 71 and the thickness of the adhesive applied to the opposite faces of the sensor substrate 71.

In the case of the example of FIG. 6, when the flexible cables 713A, 713B and 713C are threaded through the through-holes 83A, 83B and 83C, respectively, the guide portions including the stepped portion 84 for the through-holes 83A, 83B and 83C are inserted between the flexible cables 713A, 713B and 713C and the portion of the sheet member 72 having the length L5 from the end edge of a short side 721.

Then, the portion of the sheet member 72 having the length L5 from the end edge of the short side 721 is positioned on the stepped portion 84. Accordingly, due to the presence of the stepped portion 84, when the operator depresses the sheet member 72 from the pointing operation face side, the operator does not feel that the portion of the sheet member 72 for the length L5 from the end edge of the short side 721 is recessed.

It is to be noted that, while, in the embodiment described above, a plurality of through-holes are provided corresponding to a plurality of flexible cables, such through-holes may be configured otherwise such that they are communicated with each other in the short side direction of the recessed portion similarly to the stepped portion 84 in the example of FIG. 6.

The configuration of the through-holes communicated with each other can be combined not only with the stepped portion 84 in the example of FIG. 6 but also with the stepped portions 247A, 247B and 247C corresponding to the flexible cables 113A, 113B and 113C in the example described hereinabove with reference to FIGS. 1 to 5D.

Other Embodiments

The position detection apparatus of the present invention can be configured in combination with a display apparatus.

Figure 7:
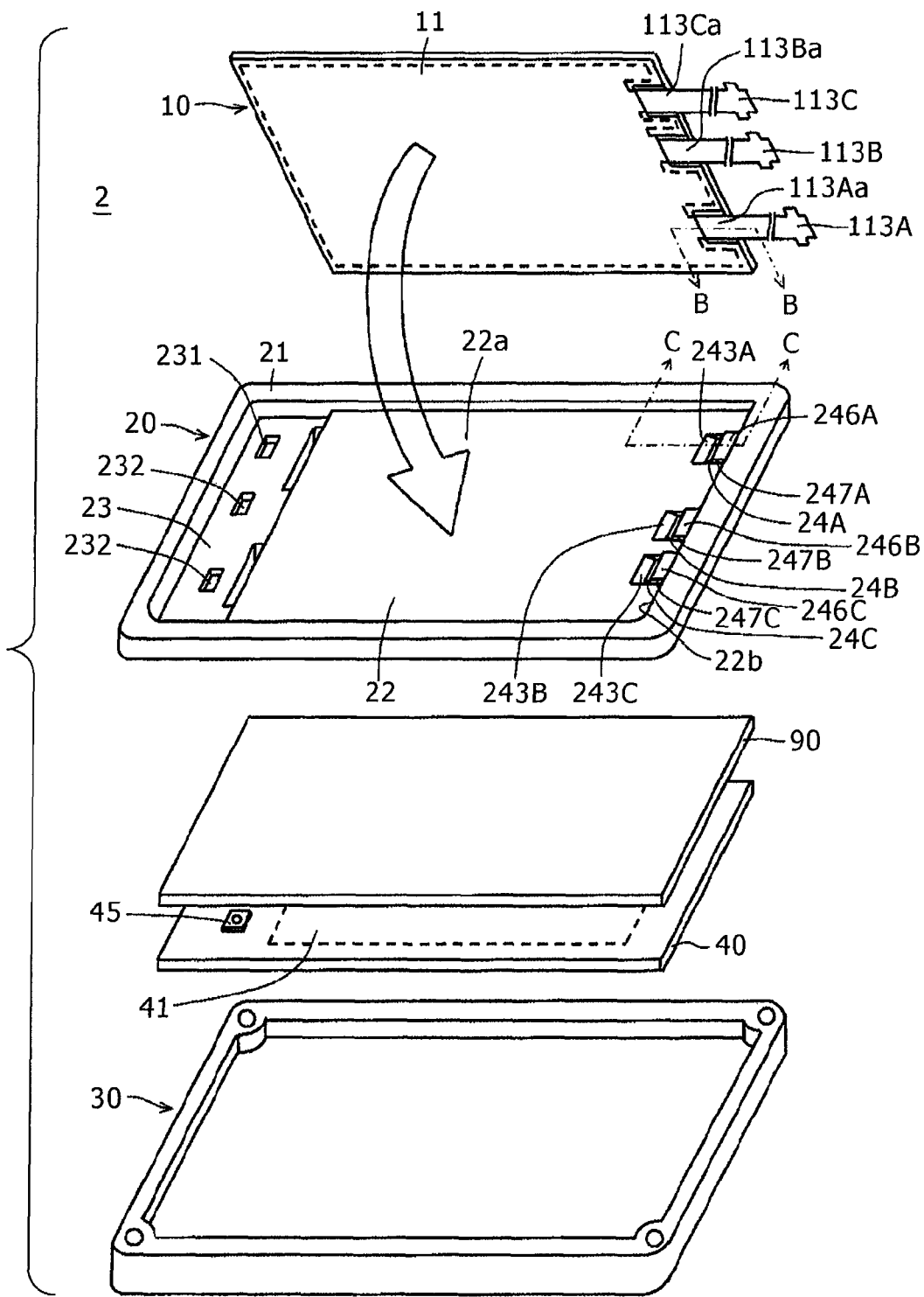
FIG. 7 is an exploded perspective view showing part of a position detection apparatus according to a further embodiment of the present invention.
Figure 8:
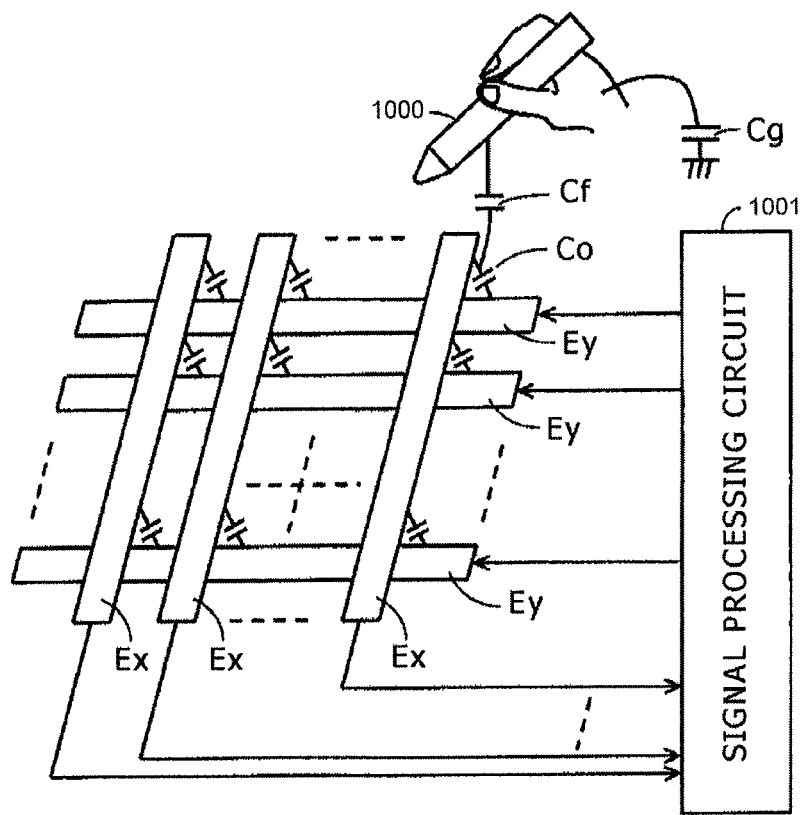
FIG. 8 is a schematic view showing a position detection apparatus of the capacitance type.

FIG. 7 is an exploded perspective view showing a position detection apparatus 2 in this instance and corresponds to FIG. 1, which shows the embodiment described hereinabove. Therefore, for simplified description, like elements to those in FIG. 1 are denoted by like reference characters, and description of the same is omitted herein to avoid redundancy.

Referring to FIG. 7, the position detection apparatus 2 of the present example is configured such that not only the printed wiring board 40 but also a display apparatus, in the present example, an LCD unit (Liquid Crystal Display) 90, are provided in the space formed between the upper case 20 and the lower case 30. In this instance, the LCD unit 90 is provided particularly between the upper case 20 and the printed wiring board 40.

The sheet member 12, which forms the position detection sensor unit 10 of the example of FIG. 7, is made of transparent resin or the like. Further, the sensor substrate 11 is configured such that transparent electrodes made of, for example, ITO (Indium Tin Oxide) are formed on a transparent flexible substrate. Also the upper case 20 is made of a transparent resin material.

The other part of the position detection apparatus 2 is configured similarly to that described hereinabove.

Further Embodiments and Modifications

While, in the embodiments described hereinabove, a plurality of flexible cables are led out from a position detection sensor unit, the present invention can be applied naturally to a configuration which includes a single flexible cable.

Further, while, in the embodiments described hereinabove, the plural flexible cables are extended all in the same direction, the present invention can be applied also where they are extended in different directions from each other.

Further, in the embodiments described hereinabove, the sensor substrate is formed as a flexible substrate and a flexible cable is formed integrally with this flexible substrate. However, the present invention can be applied also to another configuration wherein the main body portion of the sensor substrate is not formed as a flexible substrate but the flexible cable is extended from the main body portion of the sensor substrate.

Further, the position detection apparatus of the embodiments described hereinabove includes the position detection sensor unit 10 of the capacitance type and the sensor section 41 of the electromagnetic induction type. However, the present invention can be applied also to a position detection apparatus which includes only a position detection sensor of the capacitance type and also to a position detection apparatus which includes a sensor section of a type other than the capacitance type and the electromagnetic induction type.

Further, in the case of a position detection apparatus which includes only the position detection sensor unit 10, the position detection sensor unit 10 need not be a position detection sensor unit of the capacitance type but may be a position detection sensor unit of the electromagnetic induction type. Further, the position detection sensor unit 10 may be a position detection sensor of a different type such as a resistive film type.

What is claimed is:

1. A position detection apparatus, comprising:
a housing in which a position detection sensor unit is disposed, said position detection sensor unit including:
(a) a sensor substrate on which conductors for detecting a position pointed to by a pointer are disposed;
(b) a position pointing operation member having a first face, on which a position is to be pointed to by the pointer, and a second face provided on the opposite side of said first face, on which said sensor substrate is disposed, said sensor substrate being fixed to the second face of said position pointing operation member; and
(c) a flexible cable having a predetermined width and length, being extended from said sensor substrate so as to be connected to a signal processing circuit for determining a position pointed to by the pointer;
wherein the housing includes a first surface that supports the detection sensor unit and a second surface opposite from the first surface, and the housing defines a slanted through-hole which extends in an oblique direction from the first surface to the second surface through which the flexible cable is threaded to extend obliquely.

2. The position detection apparatus according to claim 1, wherein said sensor substrate is formed of a flexible substrate and said flexible cable is integrally led out from said flexible substrate.

3. The position detection apparatus according to claim 1, wherein a plurality of flexible cables are extended in the same direction from said sensor substrate.

4. A position detection apparatus, comprising:
an upper case;
a lower case coupled to said upper case;
a position detection sensor unit disposed on an upper face side of said upper case and configured to detect a position pointed to by a pointer; and
a signal processing circuit disposed in a space formed between said upper case and said lower case;
wherein said position detection sensor unit includes: (a) a sensor substrate, on which conductors for detecting a position pointed to by the pointer are disposed, (b) a position pointing operation member having a first face, on which a position is to be pointed to by the pointer, and a second face provided on the opposite side of said first face, on which said sensor substrate is disposed, said sensor substrate being fixed to the second face of said position pointing operation member, and (c) a flexible cable having a predetermined width and length, being extended from said sensor substrate so as to be connected to said signal processing circuit for determining a position pointed to by the pointer;
wherein the upper face side of said upper case has a recessed portion, in which said position detection sensor unit is disposed and in which a slanted through-hole extending in an oblique direction from the upper face side to a lower face side is provided such that said flexible cable is threaded through said slanted through-hole into the space formed between said upper case and said lower case to be connected to said signal processing circuit disposed in the space formed between said upper case and said lower case.

5. The position detection apparatus according to claim 4, wherein the upper case includes a stepped portion near said slanted through-hole in said recessed portion, said stepped portion having a height relative to the bottom of said recessed portion and said height corresponding to the thickness of said sensor substrate.

6. The position detection apparatus according to claim 4, wherein said position detection sensor unit is of a capacitance type.

7. The position detection apparatus according to claim 4, wherein said position detection sensor unit is of an electromagnetic induction type.

8. The position detection apparatus according to claim 4, wherein said position detection sensor unit is of a capacitance type, and the position detection apparatus further comprises a sensor of an electromagnetic induction type provided in the space between said upper case and said lower case.

9. The position detection apparatus according to claim 4, wherein said position pointing operation member and said sensor substrate each have optical transparency, and a display panel is provided in the space between said upper case and said lower case.

\* \* \* \* \*